United States Patent Office 3,408,180
Patented Oct. 29, 1968

3,408,180
METHOD OF PRODUCING AN INORGANIC
FOAM AND PRODUCT
Joseph Winkler, Hazleton, Pa., assignor, by mesne assignments, to General Foam Corporation, New York, N.Y., a corporation of Delaware
No Drawing. Continuation-in-part of application Ser. No. 519,530, Jan. 10, 1966. This application Sept. 12, 1966, Ser. No. 578,454
10 Claims. (Cl. 75—221)

ABSTRACT OF THE DISCLOSURE

A method is described for preparing cellular inorganic materials. According to the method an open pore organic foam such as polyurethane is coated with a carbonizable support layer such as an acrylic resin and dried. The resulting product is then coated with sinterable inorganic particles and again dried. The underlying foam is heat decomposed, and the support layer carbonized by heating. In the final step, the inorganic particles are sintered with heat.

---

This application is a continuation-in-part of copending application Serial No. 519,530 filed January 10, 1966, now abandoned.

This invention relates to porous materials and more particularly to open-pore cellular foams of materials such as metals, metal alloys, metal oxides, ceramics, glasses and the like. More specifically, it relates to novel methods for producing sturdy well-formed porous cellular foams.

Cellular materials, particularly those of metals and metal alloys, have come into prominence in recent times, primarily because of the unusual combinations of physical characteristics that can be imparted to them. For example, cellular materials in the form of metal foams can be fabricated as soft, hard or rigid material having a variety of applications. When the metals are the high melting refractory type such as tungsten, molybdenum, columbium, hafnium and their alloys, and the pores are subsequently filled with lower melting metals such as lithium, silver and the like, the structures are resistant to ultrahigh temperatures and erosion and are useful in the manufacture of rocket nozzles.

When made of high melting metals, glass or ceramics, the foams are useful as filtering devices for hot liquids and gases. Foams made from alumina, silica and the like, provide excellent support materials for catalysts because of their large surface area per unit volume. Other metal foams can be used as heat exchange devices or can be filled with abrasive material thereby providing good drilling and grinding tools.

Although inorganic foam bodies, as can be seen from the above, open up entirely new areas of technology, the art has been seriously hampered in that available processes for producing the foams have inherent disadvantages which greatly affect the quality of the foamed material produced.

For example, current modes of producing inorganic foams primarily involve one of two general methods. One method involves dispersing the desired inorganic material throughout a foamable composition, and then foaming the entire mixture. While this method is usually effective, it is only useful where cell structure is immaterial such as in the preparation of lightweight building materials. This is so because the internal cell structure actually consists of cells or vacuoles surrounded by solid masses of the inorganic material. There is little, if any, continuity of space throughout the material rendering the mass incapable of allowing gas or liquids to pass through.

The other method which has received fairly widespread attention basically involves impregnating an existing organic foamed material with the desired inorganic material, the latter usually being in the form of a slurry, and burning away the organic foam to leave an inorganic skeletal structure. For example, in U.S. Patent No. 3,111,396 issued to Ball on November 19, 1963, and assigned to General Electric Company, there is described such a process.

In this process the patentee forms a slurry of the inorganic material and desirably a binder therefor, in a suitable liquid vehicle, and impregnates a slab of open-pore polyurethane foam therewith. After evaporation of the liquid vehicle, the impregnated slab is fired at a high temperature to (a) decompose the organic skeleton, (b) carbonize and ultimately fire away the organic binder materials if any were used, and (c) sinter the inorganic particles to a unitary form. The difficulty with this procedure is that if no binder is used to hold the particles together, the subsequent elimination of the underlying polyurethane core removes essentially all support for the inorganic particles originally coated thereon with the result that the inorganic layer, to a very great extent, crumples and collapses. On the other hand when a binder material is incorporated into the slurry to provide support for the particles, the problem is only partially eliminated. This is so because the binder material, of necessity, takes up space that could have been occupied by more inorganic particles and to that extent results in a difficult sintered product and one which is greatly reduced in volume. Moreover, although the bound inorganic coating will tend to be more firm upon heating and removal of the underlying polyurethane structures, subsequent heat treatment at sintering temperature will cause the binder to decompose prior to the sintering of the inorganic particles. Since the particles are no longer bound, the inorganic structure will tend to collapse easily before sintering.

Similarly, in U.S. Patent No. 3,090,094 issued May 21, 1963 to Schwartzwalder et al., and assigned to General Motors Corporation, the patentees describe much the same procedure as is disclosed in the Ball patent except that the inorganic materials are ceramics. As can be appreciated by those skilled in the art, the prior art processes, typified by the above-mentioned patents, utilize techniques which tend to limit the amount of inorganic material that can go into a foamed body. When this is considered with the inherent difficulties in providing a unitary porous body from small particles, it will be realized that the means for achieving good results are in conflict with the end sought.

The present invention seeks to overcome and substantially eliminate the aforementioned problems by providing a novel process for applying the inorganic coating to the organic foam. In general, this process involves applying to an open pore organic structure a plastic, carbonizable material, the carbonizing temperature of which is above the decomposition temperature of the underlying organic structure, providing thereby a firm, supporting layer essentially replicating the cells of the underlying organic structure.

On this firm supporting layer there is cast a sinterable inorganic substance in the form of particles dispersed throughout a suitable medium. The temperature at which the inorganic substance is sinterable will be above that at which the plastic support layer is carbonizable. The resulting structure is then fired at temperatures and for periods of time sufficient to sequentialy decompose underlying organic foam structure to volatile liquids and vapors, carbonize the plastic support layer, and sinter the inorganic particles into a unitary form. The temperatures may be gradually raised as each one of these operations is completed. The effect of this novel process is to allow the application of an inorganic layer, which need not contain any binder material, and which therefore has maximum concentration of inorganic particles dispersed therethrough, onto a layer which provides support therefor. Maximum particle packing can be obtained, thereby minimizing the danger of shrinking and collapse upon subsequent removal of the underlying organic structure and sintering of the inorganic material. It should be emphasized that the inorganic material is deposited upon a plastic support layer, which itself is deposited upon the underlying organic foam structure. Each layer essentially replicates that of the organic structure. The resulting assembled structure represents a novel composition.

With respect to the open-pore organic structures which are employed in the present invention, it is preferred to use polyurethane foams which are essentially completely open-pore; that is, those which have essentially no membranes between strands of the foam. Such foams are typically referred to as "reticulated" and "100% open pore" foams and are described in U.S. Patent No. 3,171,820. Of these, it is preferred to use foams which have open cell sizes ranging from 10–100 pores per linear inch. Also suitable for use, are other foams which, although referred to as open pore, actually are of the order of 70–80% open-pore with the remainder being closed pore. While suitable, they are not as desirable as the essentially completely open pore structure for the reason that subsequent impregnation with both the plastic support layer and the inorganic layer will be limited to the extent that closed pores exist. The inorganic foam produced from a structure so impregnated will then be correspondingly less homogeneous. It will be understood, however, that the foams so produced nevertheless exhibit the qualities and attributes of the invention and are superior to inorganic foams produced from the very same organic structures using prior art techniques.

The organic foam itself, although preferably a polyurethane, may be any open pore organic foam. It should be heat decomposable to volatile products at reasonable temperatures and thus be easily removable from the binder layer which is deposited thereon. Polyurethanes are eminently suited for this purpose being normally completely decomposable at temperatures between about 175° C. to 275° C.

Once the foam material has been selected, it is impregnated with the plastic material so that a layer of the plastic material is cast upon substantially the entire surface, cellular and external, of the foam. This is conveniently achieved by forming a thick, heavy, preferably thixotropic mixture, of the plastic material in a suitable aqueous or volatile organic medium and working or kneading the mixture into the organic foam. The plastic material itself is characterized by being carbonizable at a tempearture above the decomposition of the underlying organic structure. As used herein "carbonizable" is meant to be indicative of those materials which can be heat decomposed to carbon and ultimately carbon dioxide. For best results, the plastic material is also elastomeric or flexible without too much brittleness and is generally non-sticky. The acrylic type of resins, such as those derived from the alkyl acrylates, are especially suited for this purpose and their use is preferred; also useable are copolymers of butadiene and styrene and butadiene and acrylics. Especially useful is a commercially available aqueous 45% acrylic resin dispersion designated Arcylic 358 and available from Dow Chemical Company. The non-brittle and non-sticky characteristics facilitate the subsequent impregnation with inorganic material. For example, since the subsequent impregnation generally involves working, squeezing and rolling of the plastic covered foam, a brittle coating would tend to crack and either be lost or provide poor support for the inorganic layer. Similarly, the non-sticky characteristic, which here is meant to mean not tacky to the touch, avoids large accumulations of plastic material within open pores and thus aids in obtaining good open pore formation for the subsequent inorganic coating.

As indicated above, the plastic material is preferably introduced into the organic foam in the form of a thick paste. It is preferred that the mixture be an aqueous paste and be thixotropic to allow the mixture to remain in the foam, once introduced, without running out. The plastic material is sutiably present in the range of from about 30 to 55% and preferably from 40 to 45 weight percent based on the weight of the mixture. The mixture is utilized in amounts sufficient to introduce from about 10–100% by weight of the plastic material based on the weight of the foam. As suitable thixotropic agents there may be mentioned the water soluble organic polymer type representative of which are polyacrylamides, polyacrylic acids, polyalginates, polyvinyl alcohol, high molecular weight polyglycols, starch, modified water solubie cellulosics such as methyl celluose and carboxy methyl cellulose, copolymers of vinyl acetate with pyrolidone and the like. Preferred for use herein is a polyacrylamide known as Acramer 250 available from American Cyanamid. The gelling agents are suitably employed at a level of from 0.1 to 2.0% and preferably from 0.5 to 1.0% based on the weight of the entire composition.

Once the plastic composition has been impregnated onto the organic foam structure, the plastic layer is next dried. That is, the volatile liquid vehicle is removed by any convenient means such as oven drying, but preferably by using heated forced air to facilitate liquid removal from deep within the foam structure. This then leaves the solid plastic coating upon which the inorganic material is to be cast.

The inorganic material is conveniently cast by using a thick, cream-like preferably thixotropic mixture of the material in a suitable liquid, preferably water, and intimately dispersing it through the plastic coated foam as by impregnating, kneading and the like. The inorganic materials useful in the invention are the heat-sinterable type capable of being reduced to small particle size, such as powders, the particles of which are preferably spherical. The particles of material must be capable of sintering together without any compacting pressure to a solid, coherent, continuous body under the influence of sufficient heat. This sintering point should be above the decomposition point of the underlying plastic layer. As is known, sintering is the term frequently used by ceramists and metallurgists to describe ultimate integration of usually powdery materials to a coherent body. During a sintering operation, which constitutes an integral operational step of this process, a compaction of the rather loosely adhering inorganic powder first takes place, and later a final consolidation of the solid body occurs at the higher firing temperature. To facilitate this fusion step, void closure between particles is necessary. This void closure proceeds faster and more completely when particulate material is spherically shaped and when the particles themselves are as small as possibe.

For this reason, it is preferred to use as finely divided inorganic particles as are availble. Furthermore, it is an additional preferred aspect of the invention to use at least two different particle sizes of inorganic material in order to provide maximum areas of surface contact in the packed layer. One such particle size is a fraction of the size of the other, normally being about one-ninth the size. From a mathematical standpoint this relationship gives about the best ratio for optimum surface contact. Different ratios may be used if desired. The particles are usually employed at levels of about 70–75 weight percent of the larger size with from 25–30 weight percent of the smaller size. A suitable composition comprises 75 weight percent of 44-micron material and 25 weight percent of 5-micron material. Additional smaller sized particles can be added, if desired.

As suitable inorganic materials there may be mentioned metals such as copper, tungsten, molybdenum, columbium, hafnium, nickel, iron, silver, cobalt and the like and their alloys; metal oxides such as aluminum oxide, zirconium oxide, titanium oxide, and the like; non-metallic oxides such as silica; various silicates such as glass, and the like.

The inorganic powder is intimately dispersed through a volatile liquid medium to facilitate top coating of the plastic-covered foam. In order to form a closely packed layer of inorganic particles, it is desirable, in addition to using small particle sizes, to form a thick paste-like composition highly concentrated with the inorganic material. It is also preferred that the mixture be thixotropic to avoid the tendency that non-thixotropic mixtures have of running out of the foam matrix prior to drying. In this regard, the paste-like composition usually contains a small amount of a gelling agent such as those mentioned above in connection with the formation of the binder composition to render it thixotropic. In general, compositions containing 30 to 55% of the inorganic powder, from 0.1 to 2.0 weight percent of the thixotropic agent based on the entire weight of the composition, with the remainder being the liquid vehicle, produce suitable results. The preferred amounts are from 40 to 45 weight percent for the powder and from 0.5 to 1.0 weight percent for the thixotropic agent. This mixture is normally applied in amounts sufficient to provide inorganic material, ranging from 0.5 to 20 and preferably 1 to 3 times the original weight of the foam.

The liquid vehicle referred to is preferably aqueous with a water-miscible, volatile, organic solvent, such as methanol, ethanol, isopropanol and the like being added for faster drying. The impregnation with this paste-like fluid is best performed by spreading it on both sides of the plastic coated foam and then kneading the foam through wringers and rollers until an apparent uniform distribution of the fluid on top and inside the foam structure is achieved. By this method as much as 90 weight percent solids and more can be imparted to the plastic covered foam based on the weight of the entire foam structure. A lower ratio of the inorganic solids to the foam can be made by using a calculated amount of the dispersion and evenly distributing this throughout the foam structure.

The structure is then treated, as for example by drying, to drive off the liquid vehicle from the inorganic layer, leaving what, in effect, is a laminated foam structure comprising the underlying organic foam base, a solid plastic layer deposited thereon, and a dry inorganic layer on the plastic layer. The drying may be effected by any known means, but it is preferred to direct a flow of warm air or any inert gas stream such as nitrogen, argon, hydrogen and the like. The gas temperature is suitably of the order of 150–250° F. at which temperature dry products are obtained in relatively short periods of time of the order of 5 to 30 minutes. The dried foam, loaded through its matrix with a coherent and adherent layer of the inorganic composition and plastic, is next subjected to a higher temperature pyrolysis step, whereby the underlying foam and plastic coating are decomposed and gasified and the inorganic powdery top layer is sintered to a coherent, structurally strong, reticulated, open-cell body, replicating the shape of the open-pore plastic matrix.

This double operation is usually performed in the same oven at properly increasing temperatures by contacting the foam with flowing air, nitrogen or the like, heated to a temperature sufficient to decompose the foam. For urethane foams, practically all of the foam is destroyed and converted mostly to gaseous and vaporous decomposition products which are carried away with the passing gas stream at temperatures of from about 175–275° C. Other gases, such as reducing gases, illustrated by carbon monoxide and hydrogen, for example, may be employed to convert any non-volatile organic material to volatile forms and to reduce metallic oxide impurities to free metal, when a metallic foam is being made. Ordinarily much higher temperatures are necessary to eliminate the remaining plastic substructure and finally sinter and fuse the inorganic powdery material to a coherent body. The necessary heat is applied to the foam, preferably by using a hot gas which is blown through the foam in an electrically heated oven. In most cases, hot nitrogen or argon is used, but for highly oxidizible metals such as aluminum, zirconium, or beryllium, hot hydrogen is preferred. To sinter and fuse high melting oxides such as $SiO_2$, $Al_2O_3$, glass and metals such as zirconium, tungsten, columbium and the like, hot argon or helium or even molecular hydrogen provided by plasma jet guns are generally used. The actual sintering temperature will vary with the particular inorganic material from which the open-pore cellular structure is prepared. This will normally be relatively close to, but not at, the melting point of the materials, as is known. In general, temperatures ranging from 5–50 degees below the true melting point of the inorganic material.

The sequential pyrolysis described above is effective to decompose and volatilize the organic foam structure, carbonize and then volatilize the plastic layer, along with any other organic materials that may have been present therein, and sinter and fuse the inorganic particles into a solid, unitary, continuous open pore foam essentially replicating the cell structure of the original foam material. The sequence of steps described, i.e. a gradual increase in temperature to accomplish each stage, is preferred for the reason that vigorous bubbling and dislocating factors are avoided in this manner. Sudden exposure to, for example, sintering temperatures, prior to essentially complete removal of the various underlying strata, may tend to disturb the inorganic structure. Moreover, such high temperatures cause formation of carbides from the residual carbon left from carbonization of the plastic material and such carbides are detrimental to the physical properties of the inorganic foam.

The following examples are given for purposes of illustration only and not by way of limitation.

EXAMPLE I

A 1% aqueous solution of Acramer P–250 (a polyacrylamide of American Cyanamid Company) is prepared by dissolving one gram of the polyacrylamide in 100 cc. of cold water with vigorous stirring and heating until a clear solution is achieved. Five drops of an antifoam silicone oil, DC–200 are added. Forty grams of this solution are mixed with 60 grams of fine copper powder. After one minute of mixing a thixotropic, non-settling, cream-like fluid results.

A 5 x 3½ x 1 inch piece of an essentially completely open-pore, reticulated polyurethane foam, having an average of 10 pores per linear inch (supplied by the Scott Paper Company) with a weight of 7.35 grams, is impregnated with about 16 grams of a thixotropic fluid made from 4 grams of 45% aqueous acrylic resin dispersion (made by the Dow Chemical Company under the name of Acrylic-358), 4 grams of water and 8 grams of the above-mentioned 1% aqueous solution of Acramer P–250. The foam piece is thoroughly impregnated with the 16 grams of the acrylic thixotropic fluid until a good uniform distribution through the foam structure is obtained. The impregnated foam is dried with an increasingly stronger and warmer air flow while being rotated and then dried in an air circulating oven kept at 105° C. until a constant weight is obtained (10.50 grams).

The dried acrylic-coated piece of the open-pore foam is next treated with 20 grams of the above-mentioned 60% thixotropic dispersion of copper powder previously prepared. The impregnation and drying of the foam is conducted in the manner described for the acrylic dispersion coating to a constant weight of 22.0 grams. The dried foam contains about 52% by weight of closely-packed 99% pure copper powder coating on top of the acrylic-coating which constitutes about 14.5% by weight, and the polyurethane constitutes about 33.5% by weight, all based on the weight of the entire structure. The coating obtained with the copper powder, when examined under the microscope, appears to be of a uniform thickness and is well composed as a continuous coating, adhering well to the underlying plastic structure.

The dried structure, is next placed in an oven and heated in a nitrogen stream to a temperature of about 260° C. After all the fumes from the decomposition of the polyurethane are gone, the oven temperature is raised slowly to the sintering temperature of copper (about 1050° C.) and kept at that temperature for a few minutes to assure a well fused, cohesive body of an open-pore copper foam having a weight of about 11 grams or about 0.75 gram per cubic inch.

EXAMPLE II

The procedure of Example I is followed using 60 grams of fine silica powder in place of the copper powder. The dried foam structure contains 33.5 weight percent of the polyurethane core structure, 14.5 weight percent of the plastic support layer and 52 weight percent of the silica layer. The sintering temperature is 1400° C. and the foam obtained weighs 10 grams or about 0.2 gram per cubic inch.

What is claimed is:

1. The method for producing an open pore cellular inorganic body which comprises the steps of:
   (a) coating substantially the entire surface of a heat decomposable open pore organic foam with a carbonizable plastic material,
   (b) drying same to provide a support layer which essentially replicates the open pore cell structure of the underlying foam,
   (c) coating said support layer with sinterable inorganic particles to form a compact layer thereof on said support layer,
   (d) drying said compact layer,
   (e) heat decomposing said organic foam and thereafter carbonizing said plastic material, and
   (f) sintering said inorganic particles into a unitary solid coherent body;
said supporting plastic material being carbonizable at a temperature greater than the decomposition temperature of said organic foam and less than the sintering temperature of said inorganic particles.

2. The method according to claim 1 wherein said plastic coated foam is coated in step (b) with a highly concentrated liquid dispersion of said inorganic particles.

3. The method according to claim 2 wherein the liquid dispersion of said inorganic particles contains a thixotropic agent sufficient in amount to render said dispersion thixotropic.

4. The method according to claim 3 wherein the organic foam is a polyurethane foam.

5. The method according to claim 4 to wherein the inorganic particles are of a metal, a metal alloy, a metal oxide, a non-metallic oxide or a silicate.

6. The method according to claim 4 wherein the inorganic particles are of nickel, copper, tungsten, iron, cobalt, silver, silica, aluminum, or silicon carbide.

7. The method according to claim 6 wherein the polyurethane foam is essentially completely open pore.

8. The method according to claim 7 wherein the plastic material is an acrylic resin.

9. The method according to claim 3 wherein said inorganic particles are of at least two sizes, one size being about one-ninth the other.

10. The method according to claim 8 wherein said inorganic particles are of at least two particle sizes, one being about one-ninth the other.

References Cited

UNITED STATES PATENTS

| | | | |
|---|---|---|---|
| 2,917,384 | 12/1959 | Grandey | 75—222 |
| 3,078,552 | 2/1963 | Grandey | 75—222 X |
| 3,090,094 | 5/1963 | Schwartzwalder. | |
| 3,111,396 | 11/1963 | Ball | 75—222 X |

FOREIGN PATENTS

| | | |
|---|---|---|
| 1,284,985 | 1962 | France. |

CARL D. QUARFORTH, *Primary Examiner.*

BENJAMIN R. PADGETT, *Examiner.*

A. J. STEINER, *Assistant Examiner.*